Oct. 13, 1970  M. TATERKA  3,533,548
METHOD OF ASCERTAINING VALIDITY OF HEAT
SEAL AND PRODUCT OF SAID METHOD
Filed Oct. 17, 1968
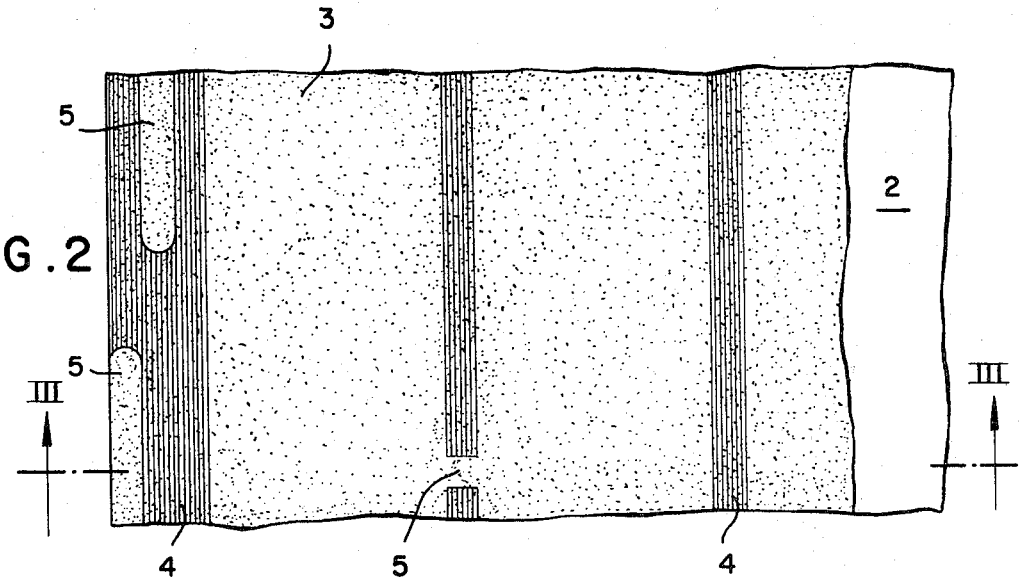
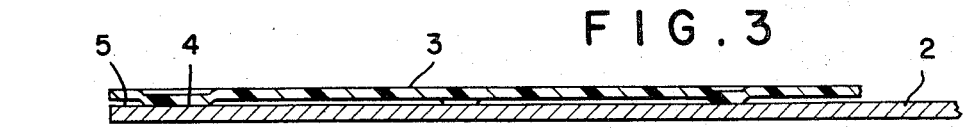
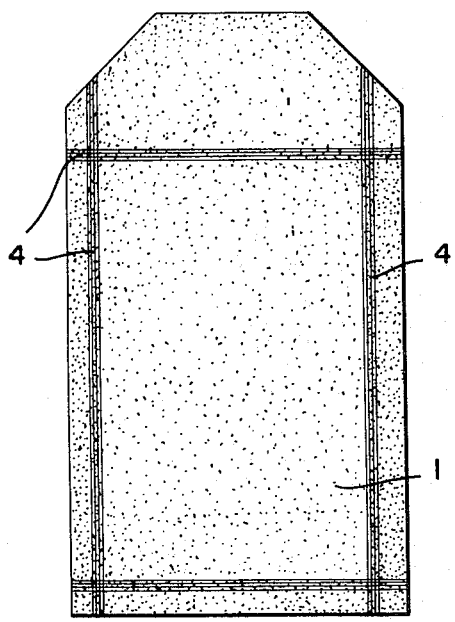
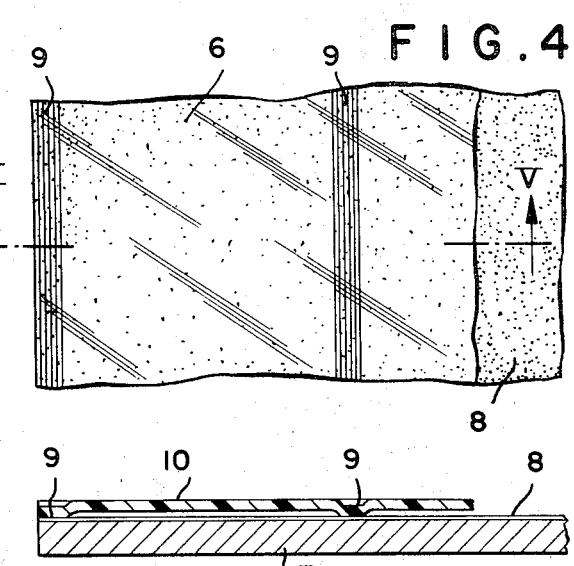
INVENTOR.
MICHAEL TATERKA
BY
Nolte and Nolte
ATTORNEYS

# United States Patent Office 3,533,548
Patented Oct. 13, 1970

3,533,548
METHOD OF ASCERTAINING VALIDITY OF HEAT SEAL AND PRODUCT OF SAID METHOD
Michael Taterka, Basking Ridge, N.J., assignor to C. R. Bard, Inc., Murray Hill, N.J., a corporation of New York
Filed Oct. 17, 1968, Ser. No. 768,438
Int. Cl. A61l 17/02
U.S. Cl. 229—48                           12 Claims

ABSTRACT OF THE DISCLOSURE

The method of ascertaining visually whether or not a certain area of a plastic film or sheet is securely sealed to an adjacent surface (e.g., a second film or sheet of plastic or other material) which comprises the coloring or tinting of the first film in a relatively light shade of a selected color, making use of the fact that a sealed area of such a colored film or sheet shows a substantially darker shade than the unsealed areas, the difference in intensity being usable to detect gaps or breaks in a sealed line or other area. The product of said method is also included.

There are many instances, particularly in the medical field, where packages are formed of plastic films or sheets marginally sealed to other films or sheets of plastic or paper. An example of the formation and use of such packages is found in the copending application of Bleecker and Faw, Ser. No. 684,999, filed Nov. 22, 1967 (now abandoned). Where the contents of a package is to be maintained in clean and/or sterile condition it is important that marginal seals be continuous and intact, but ascertainment of the existence of such conditions is difficult when the upper plastic layer is clear and the lower layer is clear or white.

Packages embodying the present invention are shown in the accompanying drawing, wherein:

FIG. 1 represents a plan view of a typical peel-open package, sealed adjacent its edges to enclose an item (not shown) requiring maintenance of sterility;

FIG. 2 represents a plan view, on an enlarged scale, of a piece of tinted plastic film or sheet, certain areas of which have been heat sealed to a paper backing sheet;

FIG. 3 represents a section on the line III—III of FIG. 2;

FIG. 4 represents a plan view of a piece of clear plastic film or sheet, certain areas of which have been heat sealed to a paper backing faced with heat seal material; and FIG. 5 represents a section on the line V—V of FIG. 4.

The package 1 is shown as being formed of a paper backing 2 and a cover film 3 of lightly tinted polyethylene or the like, heat sealed together adjacent the margins along the lines 4. Said lines appear much darker than the unsealed areas and it is thus easy to detect visually the existence of a gap or interruption in the seal, as indicated at 5.

As an alternative the same effect may be observed when a clear plastic film 6 is heat sealed to a sheet of cardboard 7 or the like, the surface of which has been coated with a lightly tinted heat seal coating 8 (FIGS. 4 and 5). In this case also the sealed areas 9 appear noticeably darker and any interruption, as at 10, can readily be detected.

Breaks in a seal line, indicated as just described, can be observed by visual inspection (e.g. on a production line) and may also be detected automatically by suitable photoelectric scanning devices.

As a further alternative the sheet 3 may be constituted by a clear film of "Mylar" (polyethylene terephthalate polyester) covered (by coating, lamination or extrusion) on its lower side by a tinted heat sealable surfacing of polyethylene. The tinted heat sealable coating could also be polypropylene, ethylene vinyl acetate (EVA), or ionomers such as "Surlyn" (Du Pont). Copolymers or mixtures of the foregoing might also be used.

What I claim is:

1. The method of visually indicating the validity of a heat seal between two heat-sealable films or sheets which includes providing one film or sheet with a light tint, sealing said tinted film or sheet to the other film or sheet in a desired area and thereby causing the sealed area to exhibit a color of different intensity from that of the tinted unsealed area.

2. The method according to claim 1 in which the tinted film or sheet is a heat sealable plastic and the other film or sheet is paper.

3. The method according to claim 2 in which the plastic is polyethylene.

4. The method according to claim 1 in which the tinted film or sheet is a heat sealable plastic and the other film or and the other film or sheet is clear plastic.

5. The method according to claim 1 which includes passing the heat sealed films or sheets through an inspection station for observation of interruptions in the seal.

6. The method according to claim 5 which includes observation by a photoelectric scanning device.

7. A heat sealed package comprising two heat-sealable films or sheets one of said films or sheets being provided with a light tint, said films or sheets being heat sealed together along suitable seal lines and said seal lines exhibiting a color of different intensity from that of the tinted unsealed area.

8. A package according to claim 7 in which the tinted film or sheet is a heat-sealable plastic and the other film or sheet is paper.

9. A package according to claim 8 in which the heat sealable plastic is a tinted surfacing on a clear film.

10. A package according to claim 9 in which the clear film is polyethylene terephthalate polyester and the tinted surfacing is selected from the group consisting of polyethylene, polypropylene, EVA, ionomers, and copolymers or mixtures thereof.

11. A package according to claim 8 in which the plastic is polyethylene.

12. A package according to claim 7 in which the tinted film or sheet is cardboard having a tinted heat seal coating and the other film or sheet is clear plastic.

References Cited

UNITED STATES PATENTS

| 2,617,149 | 11/1952 | Rubin | 264—40 |
| 3,143,209 | 8/1964 | Turiansky | 206—63.3 |
| 3,035,691 | 5/1962 | Rasmussen et al. | 206—63.2 |
| 3,147,861 | 9/1964 | Kurtz | 206—63.3 |

DAVID M. BOCKENEK, Primary Examiner

U.S. Cl. X.R.

206—63.3; 161—6

UNITED STATES PATENT OFFICE
CERTIFICATE OF CORRECTION

Patent No. 3,533,548   Dated October 13, 1970

Inventor(s)   Michael Taterka

It is certified that error appears in the above-identified patent and that said Letters Patent are hereby corrected as shown below:

In the specification:

Column 2, line 27, the second line of claim 4 should read:

--film or sheet is cardboard having a tinted heat seal coating--

Signed and sealed this 9th day of May 1972.

(SEAL)
Attest:

EDWARD M. FLETCHER, JR.   ROBERT GOTTSCHALK
Attesting Officer   Commissioner of Patents